US012271961B2

(12) United States Patent
Saeki et al.

(10) Patent No.: US 12,271,961 B2
(45) Date of Patent: Apr. 8, 2025

(54) POWER TRADING SYSTEM AND POWER TRADING METHOD

(71) Applicant: HONDA MOTOR CO., LTD., Tokyo (JP)

(72) Inventors: Hibiki Saeki, Wako (JP); Takahiro Shinke, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/163,439

(22) Filed: Feb. 2, 2023

(65) Prior Publication Data

US 2023/0306534 A1 Sep. 28, 2023

(30) Foreign Application Priority Data

Mar. 28, 2022 (JP) ................................ 2022-051726

(51) Int. Cl.
*G06Q 50/06* (2024.01)

(52) U.S. Cl.
CPC .................................... *G06Q 50/06* (2013.01)

(58) Field of Classification Search
CPC ......... G06Q 50/06; G06Q 30/06; G06Q 40/04
See application file for complete search history.

(56) References Cited

U.S. PATENT DOCUMENTS

2003/0074304 A1* 4/2003 Okada .................... G06Q 50/06 705/37
2015/0309549 A1* 10/2015 Okabe .................. H02J 3/0073 713/330

(Continued)

FOREIGN PATENT DOCUMENTS

DE 11 2017 001 212 T5 12/2018
JP 2003-091659 A 3/2003

(Continued)

OTHER PUBLICATIONS

L. Mazzola, A. Denzler and R. Christen, "Peer-to-Peer Energy Trading in Microgrids:Towards an Integrated Open and Distributed Market," 2020 International Conference on Electrical Engineering and Control Technologies (CEECT), Melbourne, VIC, Australia, 2020, pp. 1-10, doi: 10.1109/CEECT50755.2020.92986.(Year: 2020).*

(Continued)

*Primary Examiner* — Michael P Harrington
*Assistant Examiner* — Tayar M Kyu
(74) *Attorney, Agent, or Firm* — Rankin, Hill & Clark LLP

(57) ABSTRACT

A power trading system includes an order reception unit configured to receive a sell order and a purchase order of power, and a power supply and demand planning unit configured to plan power supply and demand between a first contractor and a second contractor. When a total value of a power transmission and distribution distance between a third contractor who sells power and the second contractor and a power transmission and distribution distance between a fourth contractor who purchases power and the first contractor is shorter than a power transmission and distribution distance between the first contractor and the second contractor, the power supply and demand planning unit plans the power supply and demand including power supply from the third contractor to the second contractor and power supply from the first contractor to the fourth contractor.

7 Claims, 10 Drawing Sheets

(56) References Cited

U.S. PATENT DOCUMENTS

| | | | | |
|---|---|---|---|---|
| 2018/0240201 | A1* | 8/2018 | Eda | G06Q 40/04 |
| 2019/0087753 | A1 | 3/2019 | Ito et al. | |
| 2019/0288512 | A1* | 9/2019 | Yasumura | G05B 15/02 |
| 2021/0291697 | A1* | 9/2021 | Nishiyama | H02J 3/008 |
| 2022/0122163 | A1* | 4/2022 | Obata | G06Q 30/08 |

FOREIGN PATENT DOCUMENTS

| | | | |
|---|---|---|---|
| JP | 2003-323559 | A | 11/2003 |
| JP | 2021-86312 | A | 6/2021 |

OTHER PUBLICATIONS

Japanese Office Action dated Oct. 24, 2023, Japanese Application No. 2022-051726, English translation included, 9 pages.
German Office Action dated Jul. 15, 2024, Application No. 10 2023 107 548.9; 7 pages.

* cited by examiner

POWER TRADING SYSTEM AND POWER TRADING METHOD

INCORPORATION BY REFERENCE

The present application claims priority under 35 U.S.C. § 119 to Japanese Patent Application No. 2022-051726 filed on Mar. 28, 2022. The content of the application is incorporated herein by reference in its entirety.

BACKGROUND OF THE INVENTION

Field of the Invention

The preset invention relates to a power trading system and a power trading method.

Description of the Related Art

A power trading system is known which receives sell orders and purchase orders of power, matches the plurality of sell orders and purchase orders and establishes orders. Generally, in such power trading, when the power is transmitted between a sell order side and a purchase order side, a consignment charge (more accurately, a power transmission and distribution network utilization charge) arises.

Japanese Patent Laid-Open No. 2021-86312 discloses a technology of providing matching by calculating a unit price of the consignment charge according to a distance between the sell order side and the purchase order side based on an address, latitude and longitude of the sell order side and the address, latitude and longitude of the purchase order side and comparing a price for which the consignment charge is added to an asking unit price of the sell order side with an asking price of the purchase order side, on the assumption that the consignment charge can be increased as a power transmission and distribution distance gets longer.

However, the orders are matched between orderers participating in power trading at the point of time and there is a problem that a power transmission and distribution distance which can be shortened is limited by the orderers at the point of time.

An object of the present invention is to provide a power trading system and a power trading method capable of shortening a power transmission and distribution distance.

SUMMARY OF THE INVENTION

One aspect of the present invention is a power trading system including: an order reception unit configured to receive a sell order and a purchase order of power; and a power supply and demand planning unit configured to plan power supply and demand between a first contractor on a side of the sell order and a second contractor on a side of the purchase order, wherein the power supply and demand planning unit, when a total value of a power transmission and distribution distance between a third contractor who sells power corresponding to reception power for the purchase order of the second contractor and the second contractor and a power transmission and distribution distance between a fourth contractor who purchases power corresponding to sell power for the sell order of the first contractor and the first contractor is shorter than a power transmission and distribution distance between the first contractor and the second contractor, plans the power supply and demand including power supply from the third contractor to the second contractor and power supply from the first contractor to the fourth contractor.

One aspect of the present invention is that the power trading system described above includes a management ledger recording unit configured to record a power supply and demand result of each of the first contractor, the second contractor, the third contractor and the fourth contractor in a management ledger.

One aspect of the present invention is that the power trading system described above includes a charge calculation unit configured to calculate a charge according to a power usage of each of the first contractor, the second contractor, the third contractor and the fourth contractor, and the power usage is a value for which a reverse flow discharge portion to a grid is reduced beforehand.

One aspect of the present invention is that the power trading system described above includes a confirmation notification unit configured to notify at least the third contractor and the fourth contractor of a plan of the power supply and demand.

One aspect of the present invention is that, in the power trading system described above, a charge/discharge resource of at least one of the third contractor and the fourth contractor is a battery loaded on a vehicle.

One aspect of the present invention is that, in the power trading system described above, the power supply and demand planning unit plans power supply from the third contractor to the second contractor based on a power purchase time of the purchase order placed by the second contractor, and plans power supply from the first contractor to the fourth contractor based on a power sell time of the sell order placed by the first contractor.

One aspect of the present invention is a power trading method including: a first step of receiving, by a computer, a sell order and a purchase order of power; and a second step of planning, by a computer, power supply and demand between a first contractor on a side of the sell order and a second contractor on a side of the purchase order, wherein, in the second step, when a total value of a power transmission and distribution distance between a third contractor who sells power corresponding to reception power for the purchase order of the second contractor and the second contractor and a power transmission and distribution distance between a fourth contractor who purchases power corresponding to sell power for the sell order of the first contractor and the first contractor is shorter than a power transmission and distribution distance between the first contractor and the second contractor, the power supply and demand including power supply from the third contractor to the second contractor and power supply from the first contractor to the fourth contractor is planned.

According to one aspect of the present invention, a power transmission and distribution distance can be shortened.

DETAILED DESCRIPTION OF THE PREFERRED EMBODIMENT

Hereinafter, an embodiment of the present invention will be explained with reference to the drawings.

Figure 1:
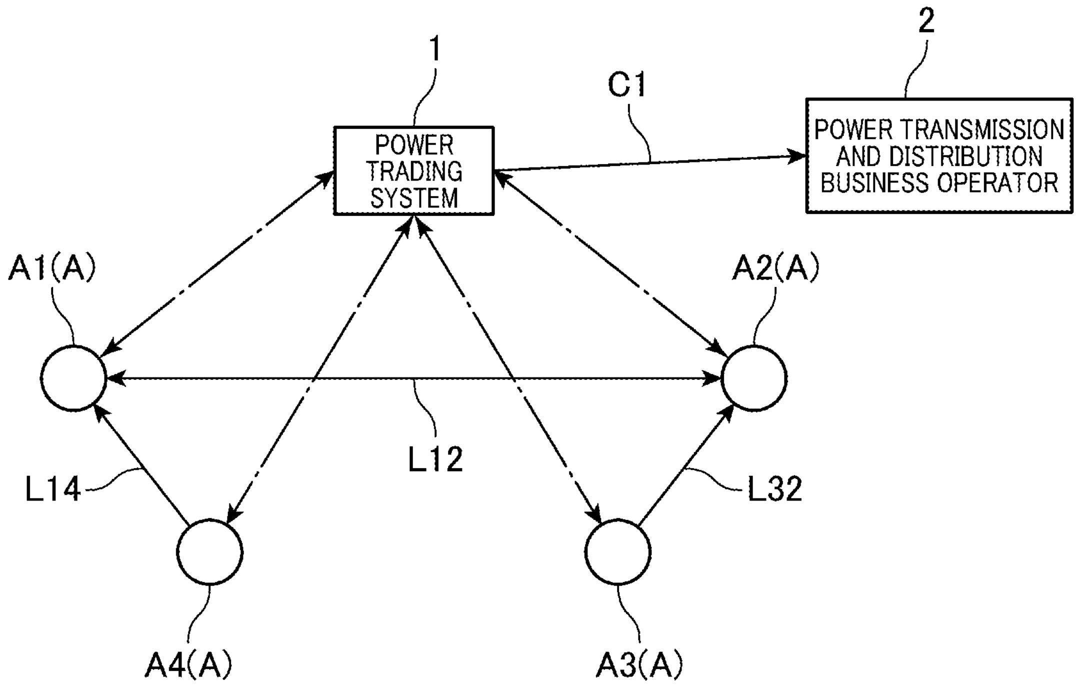
FIG. 1 is a schematic explanatory diagram of a power trading system relating to an embodiment of the present invention.

FIG. 1 is a schematic explanatory diagram of a power trading system 1 relating to the present embodiment.

The power trading system 1 is a system which provides a power trading service.

The power trading service of the present embodiment provides so-called P2P (Peer-to-Peer) power trading of receiving a sell order and a purchase order of power from each of a plurality of contractors A under contract for the utilization, matching the sell order and the purchase order, establishing an order between the contractor A on a sell order side (referred to as a "first contractor A1", hereinafter) and the contractor A on a purchase order side (referred to as a "second contractor A2", hereinafter) and making the first contractor A1 and the second contractor A2 conclude a power sales contract B1.

Further, when a power transmission and distribution distance L12 between the first contractor A1 and the second contractor A2 who have concluded the power sales contract B1 is to be shortened by utilizing sell power by a third contractor A3 and purchase power by a fourth contractor A4 not participating in the P2P power trading at the point of time, the power trading system 1 of the present embodiment executes control of turning power supply and demand of the first contractor A1 and the second contractor A2 to power supply and demand utilizing the sell power and the purchase power of the third contractor A3 and the fourth contractor A4.

Specifically, as illustrated in FIG. 1, when a total value of a power transmission and distribution distance L32 between the third contractor A3 who sells power corresponding to reception power for the purchase order of the second contractor A2 and the second contractor A2 and a power transmission and distribution distance L14 between the fourth contractor A4 who purchases the power corresponding to sell power for the sell order of the first contractor A1 and the first contractor A1 is smaller than the power transmission and distribution distance L12 (L14+L32<L12), the power trading system 1 performs the control so as to perform the power supply and demand by power supply from the first contractor A1 on the sell order side to the fourth contractor A4 on a power purchase side and power supply from the third contractor A3 on a power sell side to the second contractor A2 on the purchase order side.

By such control, the actual power transmission and distribution distance L12 in the P2P power trading between the first contractor A1 and the second contractor A2 is shortened to the total value (=L14+L32) of the power transmission and distribution distance L14 and the power transmission and distribution distance L32. Thus, when a consignment charge is set to be higher as the power transmission and distribution distance L12 becomes longer, by the control of the power trading system 1, the consignment charge is turned to a low price by shortening the power transmission and distribution distance L12 for the power sales contract B1 between the first contractor A1 and the second contractor A2, and a cost required for power sales is lowered. Thus, utilization of the P2P power trading is promoted.

In addition, the power trading system 1 of the present embodiment records a result of the power supply and demand (supply and use) of each of the first contractor A1-the fourth contractor A4 in a management ledger C1 for which tampering resistance is improved using a blockchain technology.

Thus, even when the power sales contract B1 is for the power supply and demand between the first contractor A1 and the second contractor A2, it can be proved to a power transmission and distribution business operator 2 by the management ledger C1 that actually the power supply is performed respectively between the first contractor A1 and the fourth contractor A4 and between the third contractor A3 and the second contractor A2, and the consignment charge according to the power transmission and distribution distance L12 between the first contractor A1 and the second contractor A2 can be prevented from arising.

Further, in the power trading system 1 of the present embodiment, contractor facilities 14 (FIG. 3) of the first contractor A1-the fourth contractor A4 each includes a smart meter 21 (FIG. 3) which reduces, when reverse flow discharge is performed from the contractor facility 14 to a power network (referred to as a "grid H", hereinafter), a count by the discharge portion. Thus, for the third contractor A3 who sells the power, the power discharged by selling the power is subtracted and the finally used power is measured by the smart meter 21. Thus, even when a charge relating to power use is calculated based on a measured value of the smart meter 21, since the charge for which the sell power portion is taken into consideration is calculated, it is not disadvantageous to the third contractor A3 who is in a position of a third party for the power sales contract B1 between the first contractor A1 and the second contractor A2.

Hereinafter, a specific example of the power trading system 1 will be explained.

Figure 2:
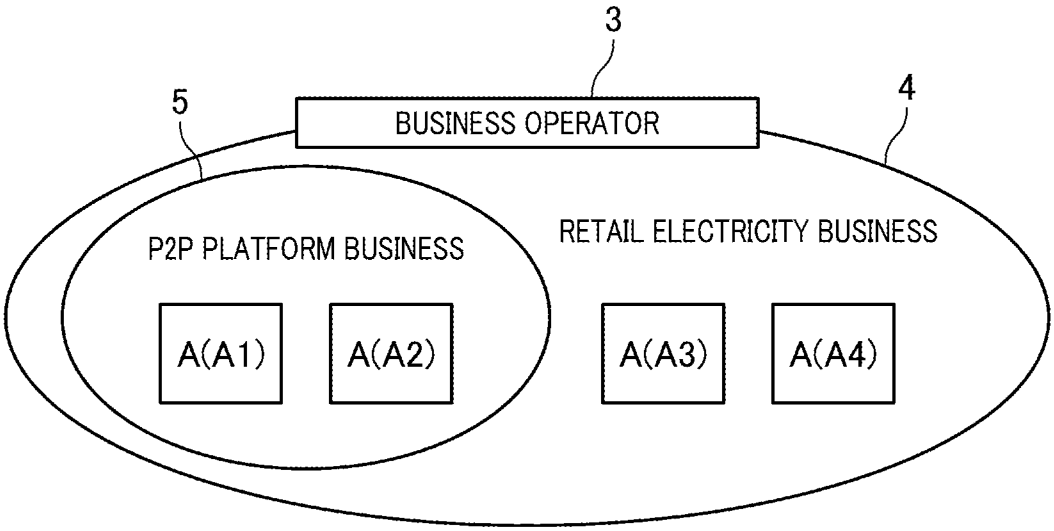
FIG. 2 is a schematic diagram of business operated by a business operator who provides a power trading service by the power trading system.

FIG. 2 is a schematic diagram of business operated by a business operator 3 who provides the power trading service by the power trading system 1.

The business operator 3 of the present embodiment operates, as illustrated in the figure, two kinds of business that are retail electricity business 4 and P2P platform business 5, as the business relating to purchase and sale of the power.

The retail electricity business 4 is a business form of purchasing the power from a power generation side and selling the power to a consumption side, a contract regarding power source procurement is made between the contractor A (the third contractor A3 in FIG. 1 and FIG. 2) on the power generation side and the business operator 3, and a contract regarding retail supply is made between the contractor A (the fourth contractor A4 in FIG. 1 and FIG. 2) on the consumption side and the business operator 3.

The P2P platform business 5 is the business of operating a P2P platform 12 (FIG. 3) where the contractor A performs the P2P power trading using a P2P processing apparatus 22 (FIG. 3) to be described later. The P2P power trading is a trading form that the first contractor A1 on the sell order side supplies the power to the second contractor A2 on the purchase order side and the second contractor A2 pays a price for the power supply through matching of the sell order and the purchase order and conclusion of the power sales contract B1, as described above.

In the P2P platform 12 of the present embodiment, in general, contract conclusion is tried preferentially between the contractors A of whom a power supply spot F1 and a power reception spot F2 are in the same or mutually adjacent areas E (FIG. 10), and when the contract is not concluded, the contract conclusion is tried between the contractors A of whom the power supply spot F1 and the power reception spot F2 are in mutually distant areas E. In addition, the contractor A can deliberately specify the other contractor A of whom the power supply spot F1 or the power reception spot F2 is in the mutually distant area E as a contract conclusion opposite party, thereby meeting needs of wanting to specify "a company contributing to environments" or "a renewable energy power plant in his/her hometown" to sell and purchase the power.

The business operator 3 of the present embodiment operates the P2P platform business 5 as optional business of the retail electricity business 4. That is, some or all of the contractors A (customers) of the retail electricity business 4 are the contractors A (customers) of the P2P platform business 5.

Then, when the power sales contract B1 is concluded between the contractors A of the P2P platform business 5, the power trading system 1 of the present embodiment attempts to shorten the power transmission and distribution distance L12 using the sell power and the purchase power by the contractors A of the retail electricity business 4.

Note that, in the present embodiment, it is assumed that all of the first contractor A1-the fourth contractor A4 are the contractors A of the retail electricity business 4, and the first contractor A1 and the second contractor A2 who are some of them are the contractors A of the P2P platform business 5.

Figure 3:
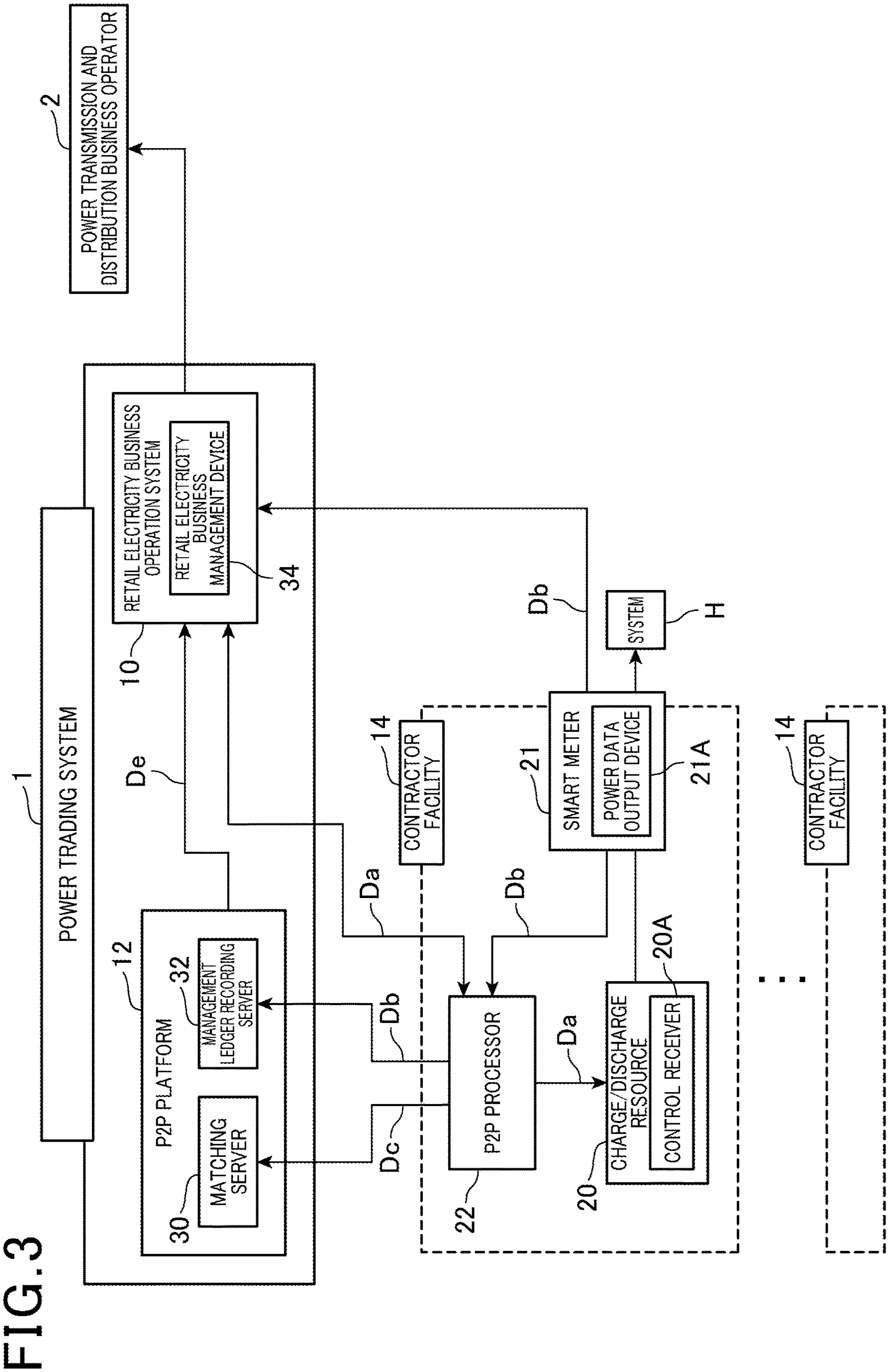
FIG. 3 is a diagram illustrating a configuration of the power trading system.

FIG. 3 is a diagram illustrating a configuration of the power trading system 1 relating to the present embodiment.

The power trading system 1 includes a retail electricity business operation system 10 which executes operations and management of the retail electricity business 4, and the P2P platform 12 for performing the P2P power trading relating to the P2P platform business 5.

A configuration of the contractor facility 14 of the contractor A will be explained first and the retail electricity business operation system 10 and the P2P platform 12 will be described later.

Each of the contractor facilities 14 of the plurality of contractors A includes a charge/discharge resource 20, the smart meter 21 and the P2P processing apparatus 22 described above.

The charge/discharge resource 20 is various kinds of resources capable of at least one of charge and discharge, and examples are devices such as a solar photovoltaic device, a stationary storage battery, an electric automobile and a heat pump water heater.

The charge/discharge resource 20 of the present embodiment is a device capable of remotely controlling the charge and the discharge, and includes a control receiver 20A which receives a control instruction Da relating to the remote control. The control instruction Da is an instruction signal for making the charge/discharge resource 20 perform the charge and the discharge by the remote control based on a power supply and demand plan Dg to be described later, and when the control receiver 20A acquires the control instruction Da, the charge/discharge resource 20 executes the charge or the discharge based on the control instruction Da.

The smart meter 21 is one aspect of a wattmeter which measures a power usage (consumption) in the contractor facility 14. The smart meter 21 of the present embodiment includes a power data output device 21A which outputs power data Db to the P2P processing apparatus 22 and the retail electricity business operation system 10, respectively. The power data output device 21A of the present embodiment outputs the power data Db to the P2P processing apparatus 22 via a LAN (Local Area Network) or a signal cable, and outputs the power data Db to the retail electricity business operation system 10 via the Internet.

The power data Db includes information relating to power use, and includes, in the present embodiment, identification information of the contractor A, the date and time when the power is used, the power supply spot F1 or the power reception spot F2 and the usage. Note that, when the power supply spot F1 or the power reception spot F2 is within Japan, a supply spot specifying number and a power reception spot specifying number may be used as information indicating the positions.

In addition, as described above, when the reverse flow discharge is performed from the charge/discharge resource 20 to the grid H, the smart meter 21 of the present embodiment measures the usage for which the reverse flow discharge portion is subtracted by reducing the count of the usage by the reverse flow discharge portion, and generates the power data Db based on the usage.

Figure 4:
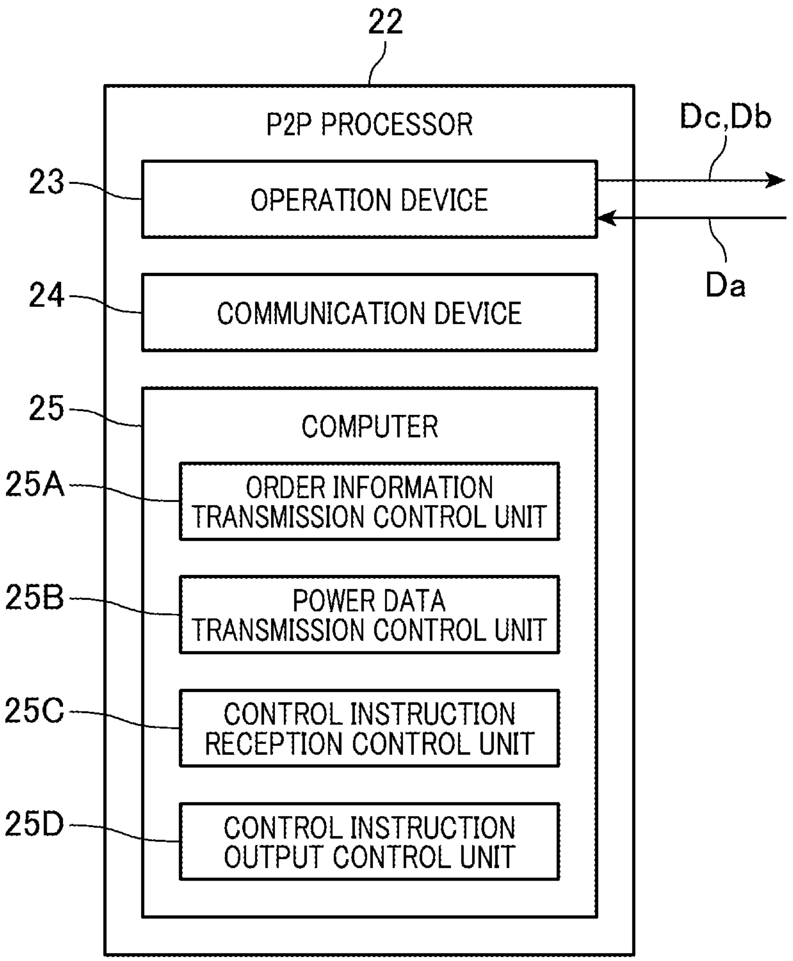
FIG. 4 is a diagram illustrating a functional configuration of a P2P processing apparatus.

FIG. 4 is a diagram illustrating a functional configuration of the P2P processing apparatus 22.

The P2P processing apparatus 22 is a device having a function of performing the P2P power trading by communicating with the P2P platform 12 and a function of outputting the control instruction Da to the charge/discharge resource 20, and specifically includes an operation device 23, a communication device 24 and a computer 25.

The operation device 23 is a device which has operation switch and receives an operation on the operation switch by the contractor A, and is used for inputting an order (the sell order/purchase order of the power) of the P2P power trading by the contractor A. The communication device 24 is a device which has a transmitter and a receiver and communicates with the P2P platform 12 via a telecommunication line of the Internet or the like.

The computer 25 includes a processor such as a CPU (Central Processing Unit) or an MPU (Micro-Processing Unit), a memory device (also referred to as a main memory unit) such as a ROM (Read Only Memory) or a RAM (Random Access Memory), a storage device (also referred to as a sub memory unit) such as an HDD (Hard Disk Drive) or an SSD (Solid State Drive), and an interface circuit for connecting the charge/discharge resource 20, the smart meter 21, various kinds of sensors and peripheral devices or the like.

Then, by the processor executing a computer program stored in the memory device or the storage device, the various kinds of functions relating to the P2P power trading and output of the control instruction Da to the charge/discharge resource 20 are realized.

Specifically, the computer 25 includes, as the functional configuration, an order transmission control unit 25A, a power data transmission control unit 25B, a control instruction reception control unit 25C and a control instruction output control unit 25D.

The order transmission control unit 25A executes the control of transmitting order information Dc relating to the sell order or the purchase order of the power, which is inputted by the contractor A, from the communication device 24 to the P2P platform 12. The order information Dc includes, for example, information relating to an asking price, information relating to a power sell time or a power purchase time, and information specifying a desired contract conclusion opposite party.

The power data transmission control unit 25B executes the control of transmitting the power data Db acquired from the smart meter 21 from the communication device 24 to the P2P platform 12.

The control instruction reception control unit 25C executes the control of receiving the above-described control instruction Da from a device (in the present embodiment, a retail electricity business management device 34 to be described later) provided in the power trading system 1 by the communication device 24, and the control instruction output control unit 25D executes the control of outputting the control instruction Da received by the communication device 24 to the charge/discharge resource 20 from the interface circuit.

By outputting the control instruction Da to the charge/discharge resource 20, as described above, the charge/discharge resource 20 performs the charge and the discharge based on the control instruction Da.

Next, the configuration of the P2P platform 12 will be explained.

The P2P platform 12 includes a matching server 30 and a management ledger recording server 32, as illustrated in previously shown FIG. 3. The matching server 30, the management ledger recording server 32 and the P2P processing apparatus 22 of each contractor facility 14 communicate with each other via the telecommunication line of the Internet or the like.

Figure 5:
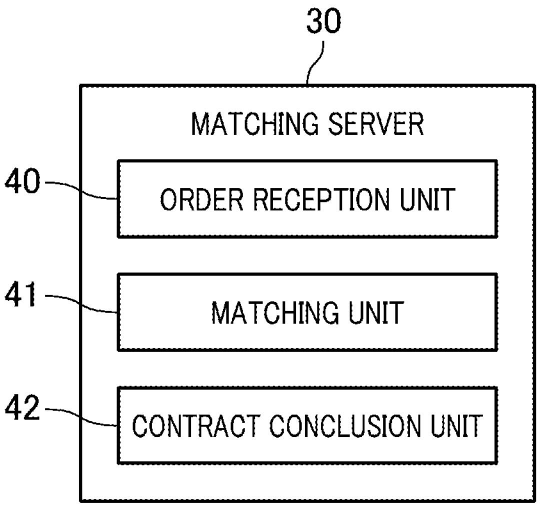
FIG. 5 is a diagram illustrating a functional configuration of a matching server.

FIG. 5 is a diagram illustrating a functional configuration of the matching server 30.

The matching server 30 is a server computer which matches the plurality of sell orders and purchase orders in the P2P power trading.

The matching server 30 of the present embodiment includes a processor, a memory device, a storage device, and an interface circuit for connecting a communication device, various kinds of sensors and peripheral devices or the like, and by the processor executing the computer program stored in the memory device or the storage device, various kinds of functions relating to matching are realized.

Specifically, the matching server 30 includes, as the functional configuration, an order reception unit 40, a matching unit 41 and a contract conclusion unit 42.

The order reception unit 40 receives the plurality of sell orders and purchase orders from the individual contractors A by receiving the order information Dc from the P2P processing apparatus 22 of each of the plurality of contractors A by the communication device.

The matching unit 41 matches the sell orders and the purchase orders based on each order information Dc, and concludes the power sales contract B1 between the first contractor A1 on the sell order side and the second contractor A2 on the purchase order side based on a matching result. The orders are matched using a publicly known or well-known appropriate method, based on the information of the asking price, the power sell time and the power purchase time or the like.

The contract conclusion unit 42 outputs P2P power trading contract conclusion information Dd relating to the contract conclusion of the P2P power trading to the retail electricity business operation system 10. The P2P power trading contract conclusion information Dd includes information (such as the identification information of the first contractor A1 and the second contractor A2, the power sell time, the power purchase time, and the information of the price) relating to the power sales contract B1 concluded between the first contractor A1 and the second contractor A2.

Figure 6:
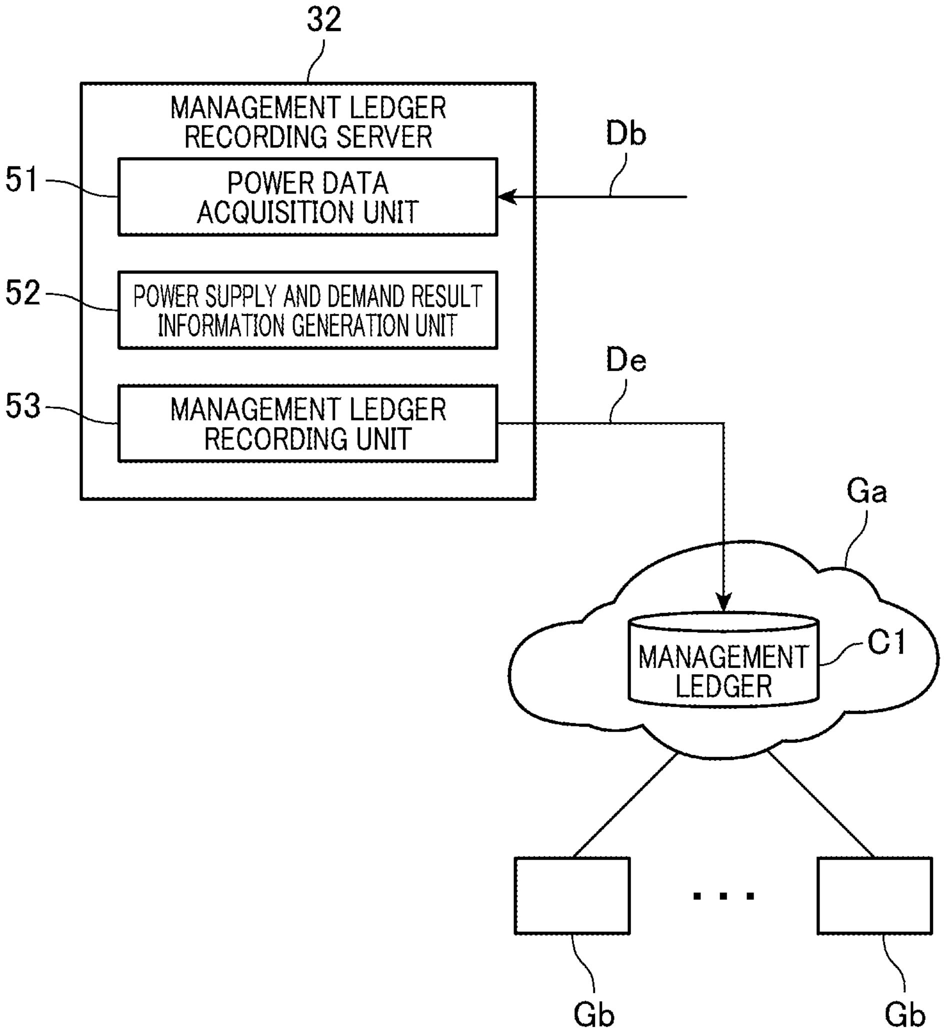
FIG. 6 is a diagram illustrating a functional configuration of a management ledger recording server.

FIG. 6 is a diagram illustrating a functional configuration of the management ledger recording server 32.

The management ledger recording server 32 is a server computer which records results of the power supply and power reception based on the power sales contract B1 in the individual contractor facilities 14 in the management ledger C1.

That is, the management ledger recording server 32 includes a processor, a memory device, a storage device, and an interface circuit for connecting a communication device, various kinds of sensors and peripheral devices or the like, and by the processor executing the computer program stored in the memory device or the storage device, various kinds of functions relating to recording of the management ledger C1 are realized.

Specifically, the management ledger recording server 32 includes, as the functional configuration, a power data acquisition unit 51, a power supply and demand result information generation unit 52 and a management ledger recording unit 53.

The power data acquisition unit 51 acquires the power data Db by receiving the power data Db from the smart meter 21 of the individual contractor facility 14 by the communication device.

The power supply and demand result information generation unit 52 generates power supply and demand result information De indicating the results of the power supply and demand for each contractor A (contractor facility 14) based on the power data Db. Specifically, the power supply and demand result information generation unit 52 sums up a supply quantity and usage of the power over a predetermined period based on the power data Db of the contractor A, and generates the power supply and demand result information De including the supply quantity and usage. Note that the power supply and demand result information De includes, in addition, appropriate information such as information of the predetermined period (such as a sum-up target period) and information relating to the contractor A (such as the identification information of the contractor A and the supply spot F1 or the power reception spot F2).

The management ledger recording unit 53 records the power supply and demand result information De in the management ledger C1.

For the management ledger C1 of the present embodiment, as described above, the blockchain technology is used, and specifically, a distributed type ledger to be shared by a plurality of participating computers Gb connected to a public network Ga is used. The participating computer Gb may be the P2P processing apparatus 22.

The management ledger recording unit 53 generates a block (also referred to as a transaction) for which the power supply and demand result information De is enciphered using a hash function, and executes addition processing for adding the block to the management ledger C1. When the addition processing is performed, the individual participating computers Gb execute predetermined arithmetic processing for confirming validity of the block, and when the validity is confirmed by a result of the arithmetic processing, the block generated by the management ledger recording unit 53 is added to the management ledger C1 shared by the individual participating computers Gb, and recording of the power supply and demand result information De to the management ledger C1 is completed.

Next, a configuration of the retail electricity business operation system 10 will be explained.

The retail electricity business operation system 10 includes the retail electricity business management device 34 which performs management relating to the retail electricity business 4 and shortening of the power transmission and distribution distance L12 described above.

Figure 7:
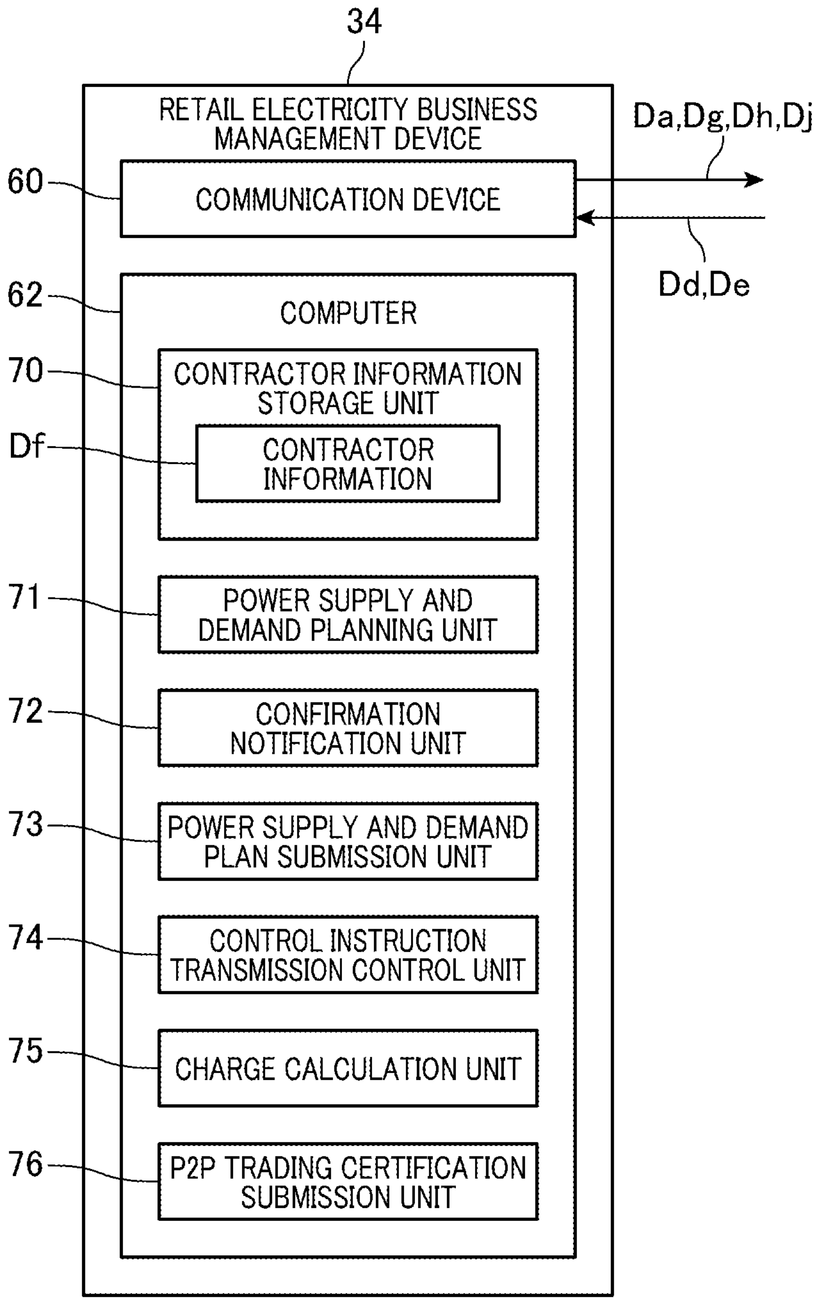
FIG. 7 is a diagram illustrating a functional configuration of a retail electricity business management device.

FIG. 7 is a diagram illustrating a functional configuration of the retail electricity business management device 34.

The retail electricity business management device 34 of the present embodiment includes a communication device 60 and a computer 62.

The communication device 60 is a device which has a transmitter and a receiver and communicates with the P2P platform 12, the individual P2P processing apparatus 22 and the power transmission and distribution business operator 2 via the telecommunication line of the Internet or the like.

The computer 62 includes a processor, a memory device, a storage device, and an interface circuit for connecting the communication device 60, various kinds of sensors and peripheral devices or the like, and by the processor executing the computer program stored in the memory device or the storage device, various kinds of functions relating to the management relating to the retail electricity business 4 and the shortening of the power transmission and distribution distance L12 are realized.

Specifically, the computer 62 includes, as the functional configuration, a contractor information storage unit 70, a power supply and demand planning unit 71, a confirmation notification unit 72, a power supply and demand plan submission unit 73, a control instruction transmission control unit 74, a charge calculation unit 75, and a P2P trading certification submission unit 76.

The contractor information storage unit 70 stores contractor information Df. The contractor information Df is information of the individual contractor A, and includes at least the identification information of the contractor A and information of the power supply spot F1 or the power reception spot F2.

The power supply and demand planning unit 71 generates the power supply and demand plan Dg indicating a plan of the power supply and demand between the supply side and the consumption side of the power, based on the P2P power trading contract conclusion information Dd.

The power supply and demand plan Dg is the information including at least the identification information of the contractor A on the power supply side and the contractor A on a power using side, the power supply spot F1, the power reception spot F2, the supply date and time to supply the power from the supply spot F1, and the using date and time to use the power at the power reception spot F2.

When the power transmission and distribution distance L12 is to be shortened by using the sell power and the purchase power by the third contractor A3 and the fourth contractor A4 of the retail electricity business 4 (that is, the contractors A not participating in the P2P power trading) other than contract subjects (the first contractor A1 and the second contractor A2) indicated by the power sales contract B1 of the P2P power trading contract conclusion information Dd, the power supply and demand planning unit 71 of the present embodiment plans the power supply and demand using the sell power and the purchase power of the third contractor A3 and the fourth contractor A4, and generates the power supply and demand plan Dg based on the plan. Note that the generation of the power supply and demand plan Dg will be described in detail later.

When the power supply and demand planning unit 71 plans the power supply and demand using the sell power and the purchase power of the third contractor A3 and the fourth contractor A4, the confirmation notification unit 72 transmits a confirmation notice Dh for obtaining an approval for the power supply and demand plan Dg from the third contractor A3 and the fourth contractor A4. The confirmation notice Dh is transmitted using appropriate means (such as mail or SNS) that allows confirmation by the third contractor A3 and the fourth contractor A4.

By the confirmation notice Dh, the third contractor A3 and the fourth contractor A4 not involved in the power sales contract B1 can recognize the power supply and demand plan Dg.

Note that the confirmation notification unit 72 may transmit the confirmation notice Dh to the first contractor A1 and the second contractor A2 in addition to the third contractor A3 and the fourth contractor A4.

By executing the control of transmitting the power supply and demand plan Dg from the communication device 60 to the power transmission and distribution business operator 2 via the telecommunication line, the power supply and demand plan submission unit 73 submits the power supply and demand plan Dg to the power transmission and distribution business operator 2. By the power supply and demand plan Dg, the power transmission and distribution business operator 2 can recognize the power supply from the supply spot F1 to the power reception spot F2, the supply quantity and the date and time.

In addition, When the power supply and demand plan Dg is the plan using the sell power and the purchase power of the third contractor A3 and the fourth contractor A4, the power supply and demand plan submission unit 73 of the present embodiment transmits the power supply and demand plan Dg to the power transmission and distribution business operator 2, on condition that the third contractor A3 and the fourth contractor A4 have approved the power supply and demand plan Dg.

Thus, the power supply and demand against intentions of the third contractor A3 and the fourth contractor A4 can be prevented.

Note that whether or not the third contractor A3 and the fourth contractor A4 have approved the power supply and demand plan Dg is detected using a publicly known or well-known appropriate method.

The control instruction transmission control unit 74 executes the control of generating the control instruction Da which makes the respective charge/discharge resources 20 on the supply side and the using side of power perform the charge and the discharge according to the power supply and demand plan Dg, and transmitting the control instruction Da to the P2P processing apparatuses 22 on the supply side and the using side from the communication device 60.

By the control instruction Da being outputted from the P2P processing apparatuses 22 to the charge/discharge resources 20, the individual charge/discharge resources 20 perform the charge and the discharge according to the power supply and demand plan Dg, and the power sales contract is completed.

The charge calculation unit 75 calculates the charge to be claimed to the individual contractor A.

In the present embodiment, the charge includes a first charge based on the contract of the retail electricity business 4 and a second charge based on the P2P power trading.

The first charge is the charge charged for the power usage in the contractor facility 14 of the individual contractor A, and the charge calculation unit 75 calculates the first charge based on the power data Db transmitted from the smart meter 21.

The second charge includes the charge charged for the power usage consumed based on the power sales contract B1 of the P2P power trading, and a monetary reward according to the supplied power quantity, and the charge calculation unit 75 calculates the second charge based on the power supply and demand result information De recorded in the management ledger C1.

By executing the control of transmitting P2P power trading certification data Dj from the communication device 60 to the power transmission and distribution business operator 2 via the telecommunication line, the P2P trading certification submission unit 76 submits the P2P power trading certification data Dj to the power transmission and distribution business operator 2.

The P2P power trading certification data Dj is the data which certifies actual pairs of the supply side and the using side of the power in the power sales contract B1 of the P2P power trading. That is, when the sell power and the purchase power of the third contractor A3 and the fourth contractor A4 are utilized, the P2P power trading certification data Dj is the data which certifies that the actual pairs of the supply side and the using side of the power in the power sales contract B1 are the first contractor A1 and the fourth contractor A4, and the third contractor A3 and the second contractor A2.

In the present embodiment, since the management ledger C1 is a distributed ledger (blockchain data) excellent in the tampering resistance and is sufficient to be used as an evidence of the power supply and demand result, the P2P trading certification submission unit 76 submits the management ledger C1 to the power transmission and distribution business operator 2 as the P2P power trading certification data Dj.

Thus, the power transmission and distribution business operator 2 can recognize the actual pairs of the supply side and the using side of the power in the power sales contract B1 of the P2P power trading based on the P2P power trading certification data Dj, and specify the power transmission and distribution distance between the supply side and the using side. Therefore, when the power transmission and distribution business operator 2 calculates the consignment charge based on the power transmission and distribution distance, the consignment charge can be accurately calculated based on the actual pair of the supply side and the using side.

Next, an operation of the power trading system 1 will be explained.

Figure 8:
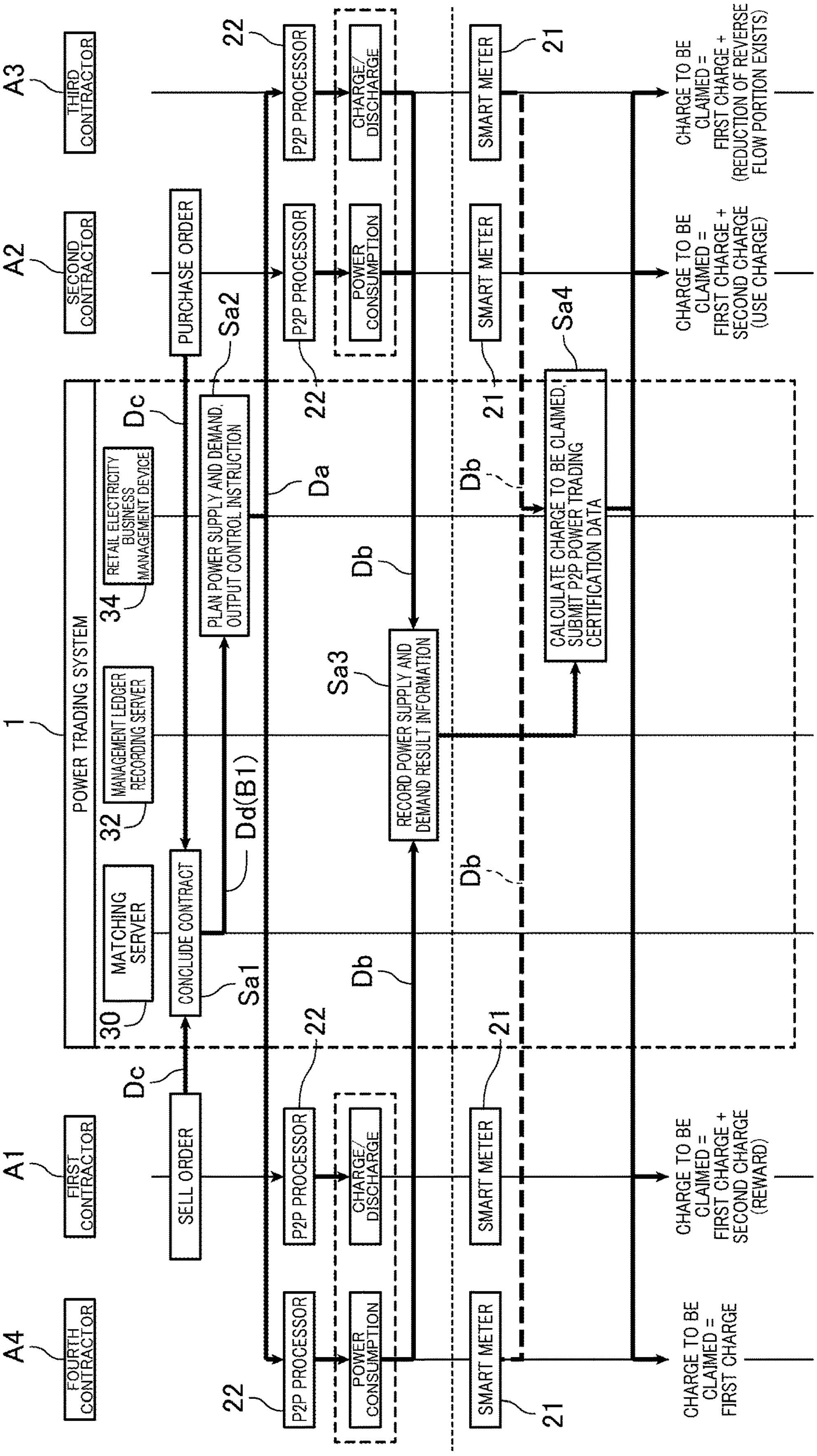
FIG. 8 is a flowchart illustrating an operation of the power trading system.

FIG. 8 is a flowchart illustrating the operation of the power trading system 1.

First, in the P2P power trading, the individual contractors A transmit the order information Dc of the sell order or the purchase order from the P2P processing apparatuses 22 to the matching server 30.

The matching server 30 receives the sell orders and the purchase orders of the individual contractors A by receiving the order information Dc, matches the sell orders and the purchase orders based on the order information Dc, and concludes the power sales contract B1 between the first contractor A1 on the sell order side and the second contractor A2 on the purchase order side. Then, the matching server 30 transmits the P2P power trading contract conclusion information Dd including the information relating to the power sales contract B1 to the retail electricity business management device 34 (step Sa1).

Then, in the retail electricity business management device 34, the power supply and demand planning unit 71 generates the power supply and demand plan Dg based on the P2P power trading contract conclusion information Dd (the power sales contract B1), and thereafter, the control instruction transmission control unit 74 transmits the control instruction Da based on the power supply and demand plan Dg to the P2P processing apparatuses 22 of the individual contractor facilities 14 (step Sa2).

Figure 9:
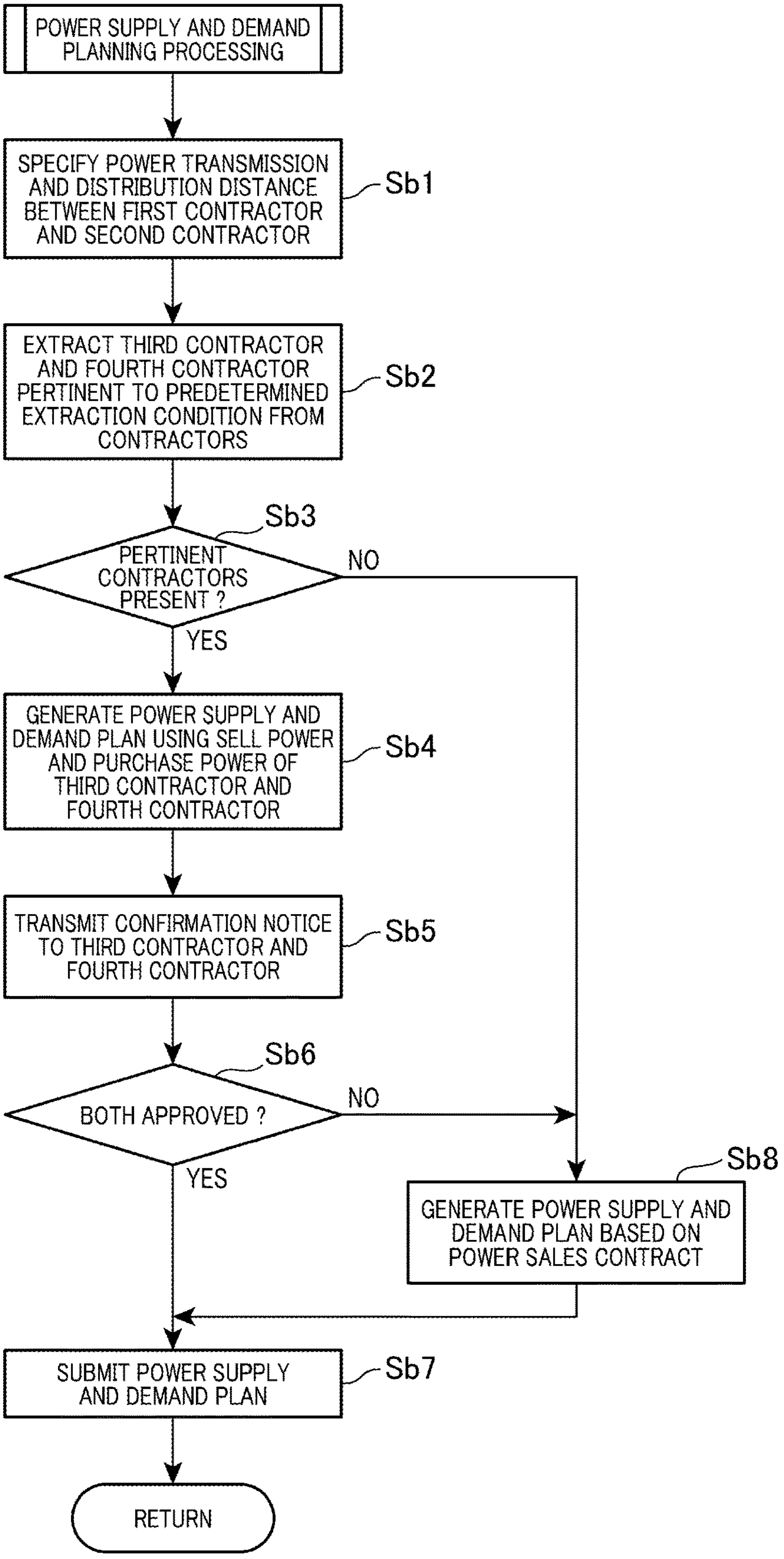
FIG. 9 is a flowchart of power supply and demand planning processing.

FIG. 9 is a flowchart of power supply and demand planning processing.

In the generation of the power supply and demand plan Dg, the power supply and demand planning unit 71 specifies the power transmission and distribution distance L12 between the first contractor A1 on the sell order side and the second contractor A2 on the purchase order side based on the contractor information Df first (step Sb1).

Next, the power supply and demand planning unit 71 extracts the third contractor A3 and the fourth contractor A4 pertinent to a following extraction condition from the contractors A of the retail electricity business 4 (step Sb2).

The extraction condition is an AND condition of following first condition and second condition.

The first condition is that the third contractor A3 is the contractor A who sells the power corresponding to the reception power for the purchase order of the second contractor A2, and the fourth contractor A4 is the contractor A who purchases the power corresponding to the sell order of the first contractor A1.

The second condition is that a total of the power transmission and distribution distance L14 between the first contractor A1 and the fourth contractor A4 and the power transmission and distribution distance L32 between the third contractor A3 and the second contractor A2 is shorter than the power transmission and distribution distance L12.

When the third contractor A3 and the fourth contractor A4 pertinent to the extraction condition exist (step Sb3: Yes), the power supply and demand planning unit 71 generates the power supply and demand plan Dg which plans the power supply and demand including the power supply from the first contractor A1 on the sell order side to the fourth contractor A4 on the power purchase side and the power supply from the third contractor A3 on the power sell side to the second contractor A2 on the purchase order side (step Sb4).

Next, the confirmation notification unit 72 transmits the confirmation notice Dh which requests the approval for the power supply and demand plan Dg to the third contractor A3 and the fourth contractor A4 (step Sb5).

Then, when a response that both of the third contractor A3 and the fourth contractor A4 approve the power supply and demand plan Dg is obtained (step Sb6: Yes), the power supply and demand plan submission unit 73 submits the power supply and demand plan Dg to the power transmission and distribution business operator 2 (step Sb7).

Thus, the power supply and demand plan Dg in which the power transmission and distribution distance L12 is shortened by utilizing the sell power and the purchase power of the third contractor A3 and the fourth contractor A4 is established.

On the other hand, when the third contractor A3 and the fourth contractor A4 pertinent to the extraction condition do not exist (step Sb3: No) or when at least one of the third contractor A3 and the fourth contractor A4 does not approve the power supply and demand plan Dg (step Sb6: No), the power supply and demand planning unit 71 generates the power supply and demand plan Dg which plans the power supply from the first contractor A1 to the second contractor A2 based on the power sales contract B1 (step Sb8), and the power supply and demand plan Dg is transmitted to the power transmission and distribution business operator 2 in step Sb7.

Figure 10:
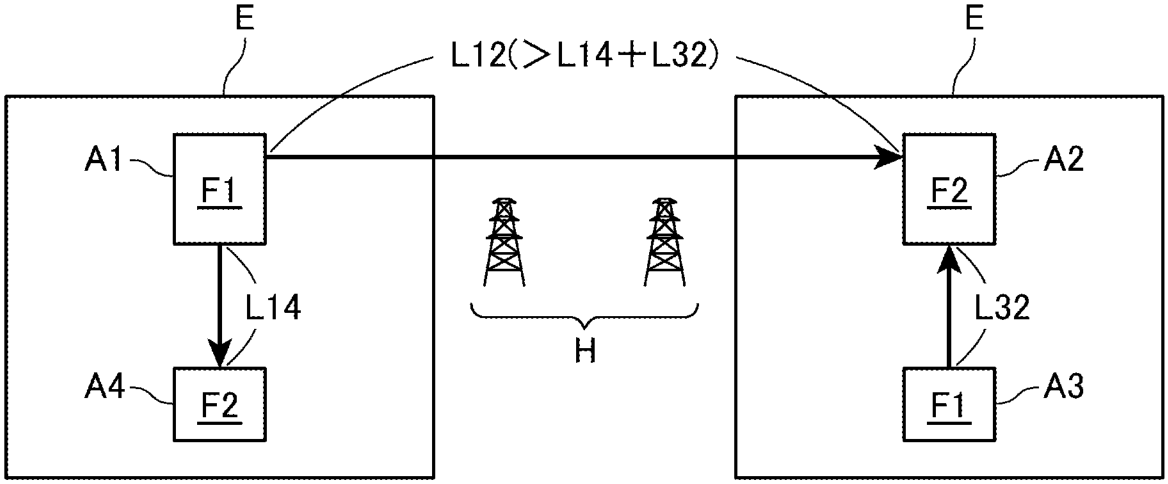
FIG. 10 is an explanatory diagram of shortening of a power transmission and distribution distance utilizing sell power and purchase power of a third contractor and a fourth contractor.

By the power supply and demand planning processing, even when the supply spot F1 and the power reception spot F2 of the first contractor A1 and the second contractor A2 of the power sales contract B1 are positioned in the areas E distant from each other as illustrated in FIG. 10, the supply spot F1 or the power reception spot F2 are present in the respective areas E or the like as illustrated in the figure for example, and the power supply and demand plan Dg utilizing the sell power and the purchase power of the third contractor A3 and the fourth contractor A4, which can shorten the power transmission and distribution distance L12, is generated.

Previously shown FIG. 8 illustrates the flowchart when the third contractor A3 and the fourth contractor A4 pertinent to the extraction condition exist, and in step Sa2 in the figure, the control instruction Da based on the power supply and demand plan Dg is transmitted to the P2P processing apparatus 22 of each of the first contractor A1-the fourth contractor A4.

Then, by the respective P2P processing apparatuses 22 outputting the control instruction Da to the charge/discharge resources 20, the charge/discharge resources 20 perform the charge and the discharge according to the power supply and demand plan Dg.

By execution of the charge and the discharge, the power data Db indicating the power quantity at the time of the charge and the discharge of the charge/discharge resources 20 is transmitted from the smart meter 21 of each of the first contractor A1-the fourth contractor A4 to the management ledger recording server 32.

Then, in the management ledger recording server 32, the power supply and demand result information generation unit 52 generates the power supply and demand result information De based on the power data Db, and the management ledger recording unit 53 records the power supply and demand result information De in the management ledger C1 (step Sa3).

Thereafter, in the retail electricity business management device 34, the charge calculation unit 75 calculates the charge to be claimed to each of the first contractor A1-the fourth contractor A4, and the P2P trading certification submission unit 76 submits the P2P power trading certification data Dj to the power transmission and distribution business operator 2 (step Sa4).

As described above, the charge includes the first charge based on the contract of the retail electricity business 4 and second charge based on the P2P power trading, and in an illustrated example, to the third contractor A3 and the fourth contractor A4 not participating in the P2P power trading, the second charge is not claimed and only the first charge charged for the power usage is claimed.

Here, when the reverse flow discharge to the grid H is generated, the smart meter 21 measures the usage for which the reverse flow discharge portion is subtracted by reducing the count of the power usage by the discharge portion. Thus, even when the first charge is calculated based on the measured value of the smart meter 21, the first charge for the third contractor A3 who has sold the power is the charge for which the sell power portion is taken into consideration, and it is not disadvantageous to the third contractor A3.

According to the present embodiment, following effects are accomplished.

The power trading system 1 of the present embodiment includes the order reception unit 40 configured to receive the sell orders and the purchase orders of the power, and the power supply and demand planning unit 71 configured to plan the power supply and demand between the first contractor A1 on the sell order side and the second contractor A2 on the purchase order side.

Then, when the total value of the power transmission and distribution distance L32 between the third contractor A3 who sells the power corresponding to the reception power for the purchase order of the second contractor A2 and the second contractor A2 and the power transmission and distribution distance L14 between the fourth contractor A4 who purchases the power corresponding to the sell power for the sell order of the first contractor A1 and the first contractor A1 is shorter than the power transmission and distribution distance L12 between the first contractor A1 and the second contractor A2, the power supply and demand planning unit 71 plans the power supply and demand including the power supply from the third contractor A3 to the second contractor A2 and the power supply from the first contractor A1 to the fourth contractor A4.

According to the configuration, by utilizing the sell power and the purchase power of the third contractor A3 and the fourth contractor A4 as the power supply and demand between the first contractor A1 and the second contractor A2, the power supply and demand for which the power transmission and distribution distance L12 between the first contractor A1 and the second contractor A2 is shortened is planned, and the power transmission and distribution distance L12 can be shortened.

The power trading system 1 of the present embodiment includes the management ledger recording unit 53 configured to record the power supply and demand result information De of each of the first contractor A1, the second contractor A2, the third contractor A3 and the fourth contractor A4 in the management ledger C1.

According to the configuration, the power supply and demand result of each of the first contractor A1, the second contractor A2, the third contractor A3 and the fourth contractor A4 is kept in the management ledger C1 as a record. Thus, the power transmission and distribution business operator 2 can recognize the power supply and demand results of the first contractor A1, the second contractor A2, the third contractor A3 and the fourth contractor A4 based on the management ledger C1, and accurately calculate the consignment charge or the like.

The power trading system 1 of the present embodiment includes the charge calculation unit 75 configured to calculate the first charge according to the power usage of each of the first contractor A1, the second contractor A2, the third contractor A3 and the fourth contractor A4, and for the power usage, the value for which the reverse flow discharge portion to the grid is reduced beforehand is used.

According to the configuration, even when the first charge is calculated based on the power usage, the first charge for the third contractor A3 who has sold the power is the charge for which the sell power portion is taken into consideration, and it is not disadvantageous to the third contractor A3.

The power trading system 1 of the present embodiment includes the confirmation notification unit 72 configured to notify the third contractor A3 and the fourth contractor A4 of the power supply and demand plan Dg.

According to the configuration, the third contractor A3 and the fourth contractor A4 not participating in the P2P power trading can recognize the power supply and demand plan Dg.

The embodiment described above just illustrates one aspect of the present invention. That is, the embodiment described above can be optionally modified and applied without deviating from the gist of the present invention, and the individual aspects relating to the embodiment, modification and application can be optionally combined.

The power trading system 1 described above includes the matching server 30 which matches the sell orders and the purchase orders. However, the matching server 30 is not always required, and the P2P processing apparatuses 22 of the individual contractors A may mutually transmit and receive the order information Dc and autonomously match the sell orders and the purchase orders.

In the power trading system 1 described above, the management ledger C1 is the distributed ledger for which the blockchain technology is used. By applying the blockchain technology further, a function of a smart contract may be mounted on the management ledger C1, and by the smart contract, control may be performed so that the individual charge/discharge resources 20 perform the charge and the discharge according to the power supply and demand plan Dg.

In the power trading system 1 described above, the charge/discharge resource 20 of the contractor A who sells the power may be a VPP (Virtual Power Plant) power source for which electric storage resources are bundled, for example. In this case, the P2P processing apparatus 22 can be used for participation in a VPP network.

In the power trading system 1 described above, the charge/discharge resource 20 of at least one of the third contractor A3 and the fourth contractor A4 may be a battery loaded on a vehicle.

According to the configuration, the third contractor A3 and the fourth contractor A4 can utilize a stationary battery provided in an electric automobile for example for power trading.

In the power trading system 1 described above, the power sales contract B1 in the P2P power trading may not be always concluded between the first contractor A1 and the second contractor A2 of which the power sell time and the power purchase time coincide.

That is, when the sell power and the purchase power of the third contractor A3 and the fourth contractor A4 can be utilized, the power can be accommodated at any time from the third contractor A3 and the fourth contractor A4. Therefore, in this case, the power supply and demand planning unit 71 may plan the power supply from the third contractor A3 to the second contractor A2 based on the power purchase time of the purchase order placed by the second contractor A2 and plan the power supply from the first contractor A1 to the fourth contractor A4 based on the power sell time of the sell order placed by the first contractor A1.

Thus, in the P2P power trading, a possibility of matching the sell order and the purchase order is increased and the P2P power trading can be promoted.

In the power trading system 1 described above, two or more of the matching server 30, the management ledger recording server 32 and the retail electricity business management device 34 may be integrated into one computer. Conversely, each of the matching server 30, the management ledger recording server 32 and the retail electricity business management device 34 may be configured by two or more computers.

Configuration diagrams referred to in the embodiments described above are the diagrams in which components are classified according to main processing contents and illustrated to facilitate understanding of the invention of the present application, and the individual components can be also classified into further more components according to the processing contents. In addition, one component can be classified so as to execute further more processing.

In the flowcharts illustrated in FIG. 8 and FIG. 9, an order of the individual steps can be optionally changed without deviating from the gist of the present invention. In addition, one step may be divided into a plurality of steps and two or more steps may be integrated into one.

(Configurations Supported by Disclosure of the Present Description)

The disclosure of the present description supports the following configurations.

(Configuration 1)

A power trading system including: an order reception unit configured to receive a sell order and a purchase order of power; and a power supply and demand planning unit configured to plan power supply and demand between a first contractor on a side of the sell order and a second contractor on a side of the purchase order, wherein the power supply and demand planning unit, when a total value of a power transmission and distribution distance between a third contractor who sells power corresponding to reception power for the purchase order of the second contractor and the second contractor and a power transmission and distribution distance between a fourth contractor who purchases power corresponding to sell power for the sell order of the first contractor and the first contractor is shorter than a power transmission and distribution distance between the first contractor and the second contractor, plans the power supply and demand including power supply from the third contractor to the second contractor and power supply from the first contractor to the fourth contractor.

According to configuration 1, the power transmission and distribution distance can be shortened.

(Configuration 2)

The power trading system according to configuration 1, including a management ledger recording unit configured to record a power supply and demand result of each of the first contractor, the second contractor, the third contractor and the fourth contractor in a management ledger.

According to configuration 2, the power supply and demand results of the first contractor, the second contractor, the third contractor and the fourth contractor can be recognized based on the management ledger.

(Configuration 3)

The power trading system according to configuration 1 or 2, including a charge calculation unit configured to calculate a charge according to a power usage of each of the first contractor, the second contractor, the third contractor and the fourth contractor, wherein the power usage is a value for which a reverse flow discharge portion to a grid is reduced beforehand.

According to configuration 3, the charge for the third contractor who has sold the power can be turned to the charge for which the sell power portion is taken into consideration.

(Configuration 4)

The power trading system according to any one of configurations 1 to 3, including a confirmation notification unit configured to notify at least the third contractor and the fourth contractor of a plan of the power supply and demand.

According to configuration 4, the third contractor and the fourth contractor not participating in power trading can recognize the plan of the power supply and demand.

(Configuration 5)

The power trading system according to any one of configurations 1 to 4, wherein a charge/discharge resource of at least one of the third contractor and the fourth contractor is a battery loaded on a vehicle.

According to configuration 5, at least one of the third contractor and the fourth contractor can utilize the battery provided in the vehicle for example for the power trading.

(Configuration 6)

The power trading system according to any one of configurations 1 to 5, wherein the power supply and demand planning unit plans power supply from the third contractor to the second contractor based on a power purchase time of the purchase order placed by the second contractor, and plans power supply from the first contractor to the fourth contractor based on a power sell time of the sell order placed by the first contractor.

According to configuration 6, the possibility of concluding the sell order and the purchase order is increased in the power trading, and the power trading can be promoted.

(Configuration 7)

A power trading method including: a first step of receiving, by a computer, a sell order and a purchase order of power; and a second step of planning, by a computer, power supply and demand between a first contractor on a side of the sell order and a second contractor on a side of the purchase order, wherein, in the second step, when a total value of a power transmission and distribution distance between a third contractor who sells power corresponding to reception power for the purchase order of the second contractor and the second contractor and a power transmission and distribution distance between a fourth contractor who purchases power corresponding to sell power for the sell order of the first contractor and the first contractor is shorter than a power transmission and distribution distance between the first contractor and the second contractor, the power supply and demand including power supply from the third contractor to the second contractor and power supply from the first contractor to the fourth contractor is planned.

According to configuration 7, the power transmission and distribution distance can be shortened.

1 power trading system
20 charge/discharge resource
30 matching server
32 management ledger recording server
34 retail electricity business management device
40 order reception unit
41 matching unit
53 management ledger recording unit
71 power supply and demand planning unit
72 confirmation notification unit
75 charge calculation unit
A contractor
A1 first contractor
A2 second contractor
A3 third contractor
A4 fourth contractor
C1 management ledger
Dg power supply and demand plan
Dh confirmation notice
L12, L14, L32 power transmission and distribution distance

What is claimed is:

1. A power trading system comprising: a matching server and a retail electricity business management device that are connected via a network, wherein the matching server includes a matching server processor functioning as:

an order reception unit configured to receive a sell order of power from a first contractor who is under a contract of power trading by matching, and receive a purchase order from a second contractor who is under the contract of the power trading by matching; and a matching unit that matches the sell order and the purchase order received by the order reception unit and concludes a power sales contract, and the retail electricity business management device includes a management side processor functioning as a power supply and demand planning unit configured to plan power supply and demand between the first contractor and the second contractor, wherein the power supply and demand planning unit, plans the power supply and demand to include a power supply from a third contractor to the second contractor and a power supply from the first contractor to a fourth contractor when the third contractor is on a side of the sell order and the fourth contractor is on a side of the purchase order, the third contractor and the fourth contractor are not participating in the power trading by matching and sell or buy power based on a power sales contract different from the power trading by matching, and a following condition is satisfied:

a total value of a power transmission and distribution distance between the third contractor and the second contractor and a power transmission and distribution distance between the fourth contractor and the first contractor is shorter than a power transmission and distribution distance between the first contractor and the second contractor; and the third contractor is a contractor who sells the power corresponding to a reception power for the purchase order of the second contractor and the fourth contractor is a contractor who purchases the power corresponding to a sell power for the sell order of the first contractor, and wherein the management side processor further functions as a control instruction transmission control unit configured to manage one or more charge/discharge resources associated with at least one of the first contractor, the second contractor, the third contractor, and the fourth contractor, and to generate and transmit a control instruction to the one or more charge/discharge resources to perform at least one of a charge operation and a discharge operation according to the planned power supply and demand, and the one or more charge/discharge resources execute at least one of the charge operation and the discharge operation upon acquisition of the control instruction.

2. The power trading system according to claim 1, wherein a management ledger recording server, which is connected to the power trading system via the network, comprises a recording processor functioning as a management ledger recording unit configured to record a power supply and demand result of each of the first contractor, the second contractor, the third contractor and the fourth contractor in a management ledger.

3. The power trading system according to claim 1, wherein the management side processor further functions as a charge calculation unit configured to calculate a charge according to a power usage on contractor facilities of each of the first contractor, the second contractor, the third contractor, and the fourth contractor, each of the contractor facilities include a smart meter, and the charge calculation unit calculates the charge by acquiring, from the smart meter, a power usage amount obtained by subtracting a discharge portion of a reverse flow discharge to a grid from the contractor facility.

4. The power trading system according to claim 1, wherein the management side processor further functions as a confirmation notification unit configured to notify at least the third contractor and the fourth contractor of a plan of the power supply and demand.

5. The power trading system according to claim 1, wherein the charge/discharge resource of at least one of the third contractor and the fourth contractor is a battery loaded on a vehicle.

6. The power trading system according to claim 1, wherein the power supply and demand planning unit plans the power supply from the third contractor to the second contractor based on a power purchase time of the purchase order placed by the second contractor, and plans the power supply from the first contractor to the fourth contractor based on a power sell time of the sell order placed by the first contractor.

7. A power trading method executing:

a first step of receiving, by a computer, a sell order of power from a first contractor who is under a contract of power trading by matching, receiving a purchase order from a second contractor who is under the contract of the power trading by matching, matching the sell order and the purchase order received, and concluding a power sales contract; and a second step of planning, by the computer, power supply and demand between the first contractor and the second contractor, wherein, the second step includes, planning the power supply and demand to include a power supply from a third contractor to the second contractor and a power supply from the first contractor to a fourth contractor when the third contractor is on a side of the sell order and the fourth contractor is on a side of the purchase order, the third contractor and the fourth contractor are not participating in the power trading by matching and sell or buy power based on a power sales contract different from the power trading by matching, and a following condition is satisfied:

a total value of a power transmission and distribution distance between the third contractor and the second contractor and a power transmission and distribution distance between the fourth contractor and the first contractor is shorter than a power transmission and distribution distance between the first contractor and the second contractor; and the third contractor is a contractor who sells the power corresponding to a reception power for the purchase order of the second contractor and the fourth contractor is a contractor who purchases the power corresponding to a sell power for the sell order of the first contractor, and the second step includes:

calculating a charge according to a power usage on contractor facilities of each of the first contractor, the second contractor, the third contractor, and the fourth contractor; and managing one or more charge/discharge resources associated with at least one of the first contractor, the second contractor, the third contractor, and the fourth contractor, and generating and transmitting a control instruction to the one or more charge/discharge resources to perform at least one of a charge operation and a discharge operation according to the planned power supply and demand, wherein the one or more charge/discharge resources execute at least one of the charge operation and the discharge operation upon acquisition of the control instruction.

* * * * *